(12) United States Patent (10) Patent No.: US 9,001,447 B1
Kim et al. (45) Date of Patent: Apr. 7, 2015

(54) ASYNCHRONOUS MEDIA DRIVE COMMUNICATIONS IN A STORAGE LIBRARY

(71) Applicant: Oracle International Corporation, Redwood City, CA (US)

(72) Inventors: Hyoungjin Kim, Boulder, CO (US); Alexander Edward Amador, Morrison, CO (US); Stephanie Lynn Russell, Erie, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/139,549

(22) Filed: Dec. 23, 2013

(51) Int. Cl.
*G11B 5/09* (2006.01)
*G11B 5/127* (2006.01)

(52) U.S. Cl.
CPC ..................................... *G11B 5/127* (2013.01)

(58) Field of Classification Search
None
See application file for complete search history.

(56) References Cited

U.S. PATENT DOCUMENTS

| 6,336,173 | B1 * | 1/2002 | Day et al. ...................... 711/161 |
| 6,353,878 | B1 * | 3/2002 | Dunham ....................... 711/162 |
| 6,791,910 | B1 * | 9/2004 | James et al. ................ 369/30.28 |

* cited by examiner

*Primary Examiner* — Muhammad N Edun
(74) *Attorney, Agent, or Firm* — Marsh Fischmann & Breyfogle LLP; Daniel J. Sherwinter

(57) ABSTRACT

Systems and methods are described for media drive operational data retrieval in a storage library in a manner that is asynchronous with respect to other drive-related communications. Embodiments operate in context of a data storage library having a robotic assembly that ferries media cartridges between media slots and media drives to fulfill requests by host systems. The media drives can communicate with a drive controller over a control path and with host systems over a data path. The drive controller can retrieve operational data from the media drive while the drive is effectively idle, and can communicate the retrieved operational data over the control path to the library. Accordingly, retrieval and communication of the drive operational data can be performed via the control path in a manner that is asynchronous with respect to data path and/or other drive-related communications.

20 Claims, 7 Drawing Sheets

ASYNCHRONOUS MEDIA DRIVE COMMUNICATIONS IN A STORAGE LIBRARY

FIELD

Embodiments relate generally to data storage systems, and, more particularly, to asynchronous media drive communications in a storage library.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic assembly finds the appropriate cartridge, removes the cartridge from its magazine, and carries the cartridge to a media drive that is designed to receive the cartridge and read its contents. Some storage libraries have multiple drives that can operate concurrently to perform input/output operations on multiple cartridges.

It is often desirable to monitor and maintain certain operational information about components of the library. Evaluation of library costs, library health, and/or other functions can involve an understanding of how long components have been operating, what functions those components were performing during operation, what types of data were being communicated to and from those components during operation, etc. For example, some storage library users periodically retrieve operational information from media drives to track a number of hours the media drive has been powered on, performance data relating to the media drive, "experience" data (e.g., information relating to behavior of a storage medium and/or a media drive while the medium was in the drive), etc. Typically, retrieval of the drive operational data is coordinated with (e.g., synchronized with) other drive related requests, such as data path requests. For example, retrieval of the operational information about a media drive is interleaved with (e.g., placed in between) read/write or other operations of the media drive.

BRIEF SUMMARY

Among other things, systems and methods are described for media drive operational data retrieval in a storage library in a manner that is asynchronous with respect to other drive-related communications. Some embodiments operate in context of a data storage library having a robotic assembly that finds, picks, and places media cartridges in media slots (e.g., in magazines) and/or media drives to fulfill requests by one or more host systems. Embodiments of the media drives communicate with library controllers (e.g., a library controller via a drive controller) over a control path and with host systems over a data path, and operate to collect their own operational data and to communicate that operational data over the control path. The drive controller can retrieve the operational data while the drive is effectively idle, and can communicate the retrieved operational data over the control path to the library controller. Accordingly, retrieval and communication of the drive operational data can be performed via the control path in a manner that is asynchronous (e.g., transparent) with respect to data path and/or other drive-related communications.

According to one set of embodiments, a storage library system is provided. The system includes: a number of storage media; a number of media drives that operate to perform input/output functions on the storage media; a robotic assembly that operates to ferry the storage media between media slot locations and the media drives; and a drive control subsystem that is in communication with the media drives over a control communications path. The drive control subsystem operates to: instruct a library control subsystem to commence a fetch sequence, whereby the robotic assembly fetches a particular one of the storage media from a particular one of the media drives; retrieve operational data from the particular media drive during the fetch sequence; and communicate the operational data to the library control subsystem upon completion of the fetch sequence.

According to another set of embodiments, a method is provided for asynchronous drive communications in a storage library having a number of media drives that are in communication with at least one host system over a data communications path, and are in communication with a drive control subsystem over a control communications path. The method includes: communicating an instruction from a drive control subsystem to a library control subsystem over the control communications path to commence a control sequence during which communication between the at least one host system and a particular one of the media drives over the data communications path is not permitted; retrieving operational data from the particular media drive during the control sequence; and communicating the operational data from the drive control system to the library control subsystem over the control communications path in conjunction with an instruction of the control sequence.

According to another set of embodiments, a system is provided for asynchronous drive communications in a storage library. The system includes: a number of media drives in communication with at least one host system over a data communications path; a non-transient memory that has instructions stored thereon; and a set of processors in communication with the media drives over a control communications path and in communication with the memory. The set of processors operate, when the instructions are executed, to perform steps including: communicating an instruction to a library control subsystem over the control communications path to commence a control sequence during which communication between the at least one host system and a particular one of the media drives over the data communications path is not permitted; retrieving operational data from the particular media drive during the control sequence; and communicating the operational data to the library control subsystem over the control communications path in conjunction with an instruction of the control sequence.

BRIEF DESCRIPTION OF THE DRAWINGS

The present disclosure is described in conjunction with the appended figures.

Figure 1:
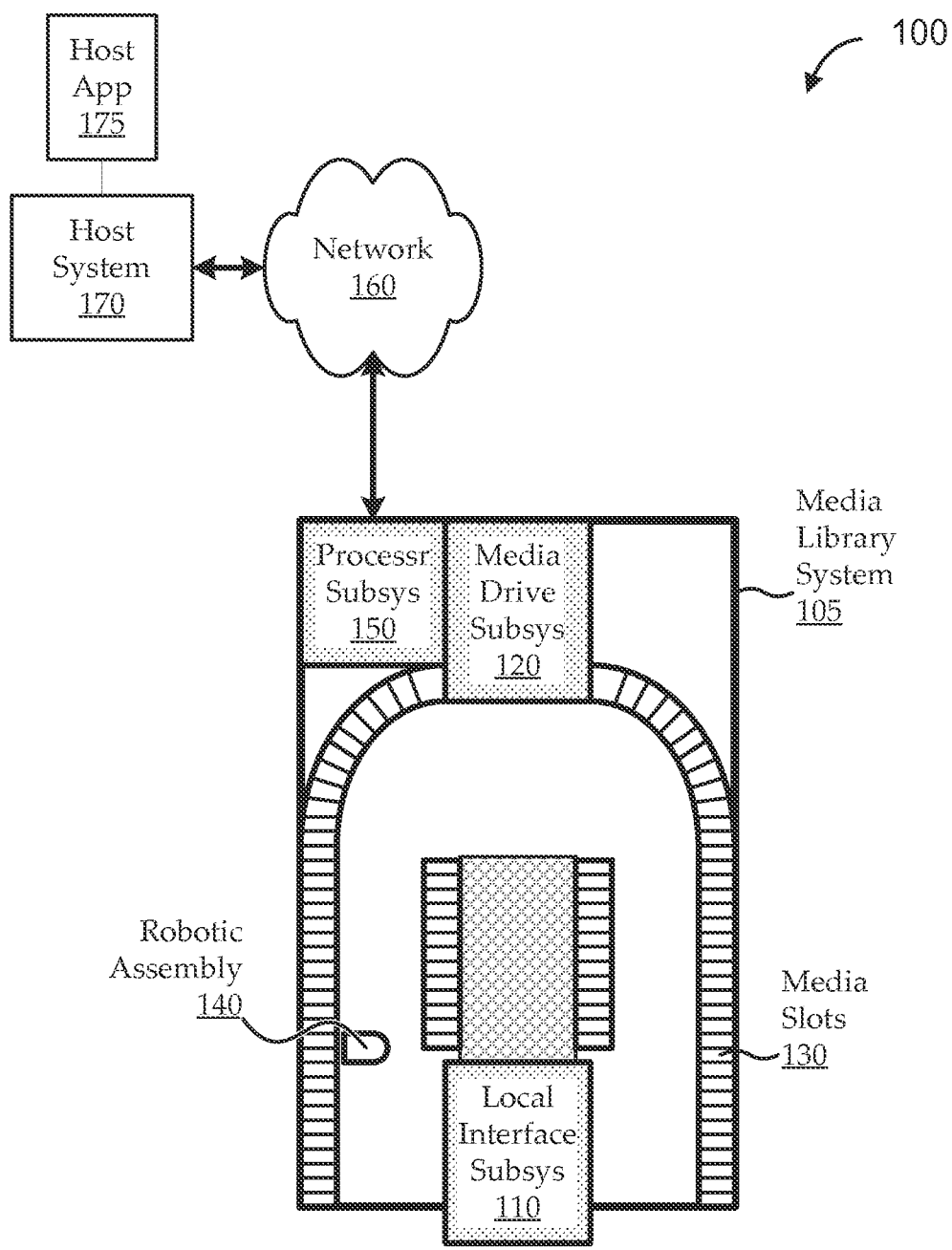
FIG. 1 shows a simplified diagram of a data storage system that provides illustrative context for various embodiments.

In the appended figures, similar components and/or features may have the same reference label. Further, various components of the same type may be distinguished by following the reference label by a second label that distinguishes among the similar components.

If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

It is often desirable to monitor and maintain certain operational information about components of the library. For example, some storage library users periodically retrieve operational information from media drives to track a number of hours the media drive has been powered on, performance data relating to the media drive, data relating to the experience of media while in the media drive, etc. Retrieving such data can involve requesting the data from the drive and receiving the data from the drive. Traditionally, sending a request for the data to the drive, waiting for the drive to output the data, and receiving the requested data from the drive involves coordinating timing with other drive requests, such as input/output requests issued over the data path. Impacting the data path and/or timing of host-level communications with the drive can be undesirable in some cases.

Some embodiments described herein retrieve media drive operational data in a storage library in a manner that is asynchronous with respect to other drive-related communications. In an illustrative storage library, a media drive can perform logical input/output (I/O) functions on storage media, and commands and data relating to those logical I/O functions can be communicated over a data communications path. From a local library perspective, many of those host-level (e.g., logical I/O) functions involve (e.g., invoke, rely on, etc.) other, library-level, logical and physical drive commands, such as mounting and dismounting of the drive, receiving and ejecting of media, etc. Commands and data relating to those library-level functions can be communicated over a control communications path between controllers (e.g., a library controller and a drive controller) and the drives. Embodiments of the media drives operate to collect their own operational data and to communicate that operational data over the control path. In some implementations, a drive controller can retrieve the operational data during a time when the drive is effectively idle (e.g., unable to perform I/O operations), for example, while a robotic assembly is in the process of fetching a medium from the drive during a dismount sequence. The drive controller can then communicate the retrieved operational data over the control path to the library controller. For example, the communication can be encapsulated with other control path communications (e.g., along with a message indicating that the fetch sequence is complete). This can reduce or eliminate any impact of retrieval and communication of the drive operational data on data path communications, as the control path implementation is effectively asynchronous with respect to other drive-related communications.

FIG. 1 shows a simplified diagram of a data storage system 100 that provides illustrative context for various embodiments. The data storage system 100 illustrated in FIG. 1 is intended only to provide one illustrative context, and is not intended to limit the scope of embodiments to any particular library architecture, components, arrangement of components, etc. While embodiments are described with reference to particular tape media storage libraries (e.g., using tape cartridges to store data), similar techniques can be applied in any suitable context, including, for example, other types of tape media storage libraries, other storage libraries that use multiple physical non-tape storage media, etc.

The data storage system 100 includes a media library system 105 that has a number of storage media (e.g., tape cartridges, or the like) located in media slots 130. One or more robotic assemblies 140 in the media library system 105 can pick and place the storage media, including ferrying the storage media between the media slots 130 and one or more media drives in a media drive subsystem 120. Some embodiments permit a user to directly interface with the media library system 105 via a local interface subsystem 110. Operations of the media library system 105, including certain functionality of the local interface subsystem 110, the media drive subsystem 120, the robotic assemblies 140, etc. can be controlled by a processor subsystem 150. For example, the processor subsystem 150 can include one or more processors in one or more locations throughout the media library system 105 that are in communication with one or more memories having instructions stored thereon, which, when executed, cause the processors to perform certain functionality.

In some embodiments, the media library system 105 includes a large number of media slots 130 arranged in arrays of rows and columns. Some or all of the media slots 130 hold storage media. For example, one implementation has 1,448 media slots 130, and expansion modules can be used to increase the capacity to up to 10,088 slots. Another implementation has 200 media slots 130, and expansion modules can be used to increase the capacity to up to 5,925 slots. The media library system 105 can also include a number of drive slots, with some or all of the drive slots holding media drives. For example, one implementation includes 64 drive slots in the media drive subsystem 120. Another implementation includes 24 drive slots, and can be expanded to up to 56 drive slots. Rails or other structure allows multiple robotic assemblies 140 to traverse the arrays of media slots 130 and drive slots, so that hand assemblies of the robotic assemblies 140 (e.g., "handbots") can perform pick and place operations on the storage media in the media slots 130 and/or media drives. For example, one implementation includes four handbots that ride on horizontal and vertical rails, so that each handbot effectively services a quarter of the media slots 130 (e.g., 362 of 1,448 media slots 130), but can physically pass each other to facilitate concurrent operations. Another implementation includes multiple (e.g., two) handbots per rail for further redundancy and/or concurrency. Some implementations include many other types of components that can be part of the illustrated subsystems or other subsystems that are not shown. For example, implementations can include one or more cartridge access ports (CAPs), power supplies and/or other power management components (e.g., AC, DC, three-phase, or other power supplies, power distribution units (PDUs), etc.), communications components (e.g., switches, hubs, servers, cables, ports, etc.), control cards, environmental sensors (e.g., fire detectors, etc.), structure (e.g., chassis, doors, service panels, open rack or shelf spaces, etc.), etc.

In some embodiments, functions of the media library system 105 can be accessed and/or controlled remotely. As illustrated, the media library system 105 can be in communication with a network 160, which can be further in communication with one or more host systems 170. For example, the host systems 170 provide remote user terminals and/or remote application interfaces by which other systems and/or human users can interact with the library. In some implementations, a host application 175 (e.g., a backup application) runs on the host system 170, which exploits the media library system 105 resources for data storage and input/output functions.

Figure 2:
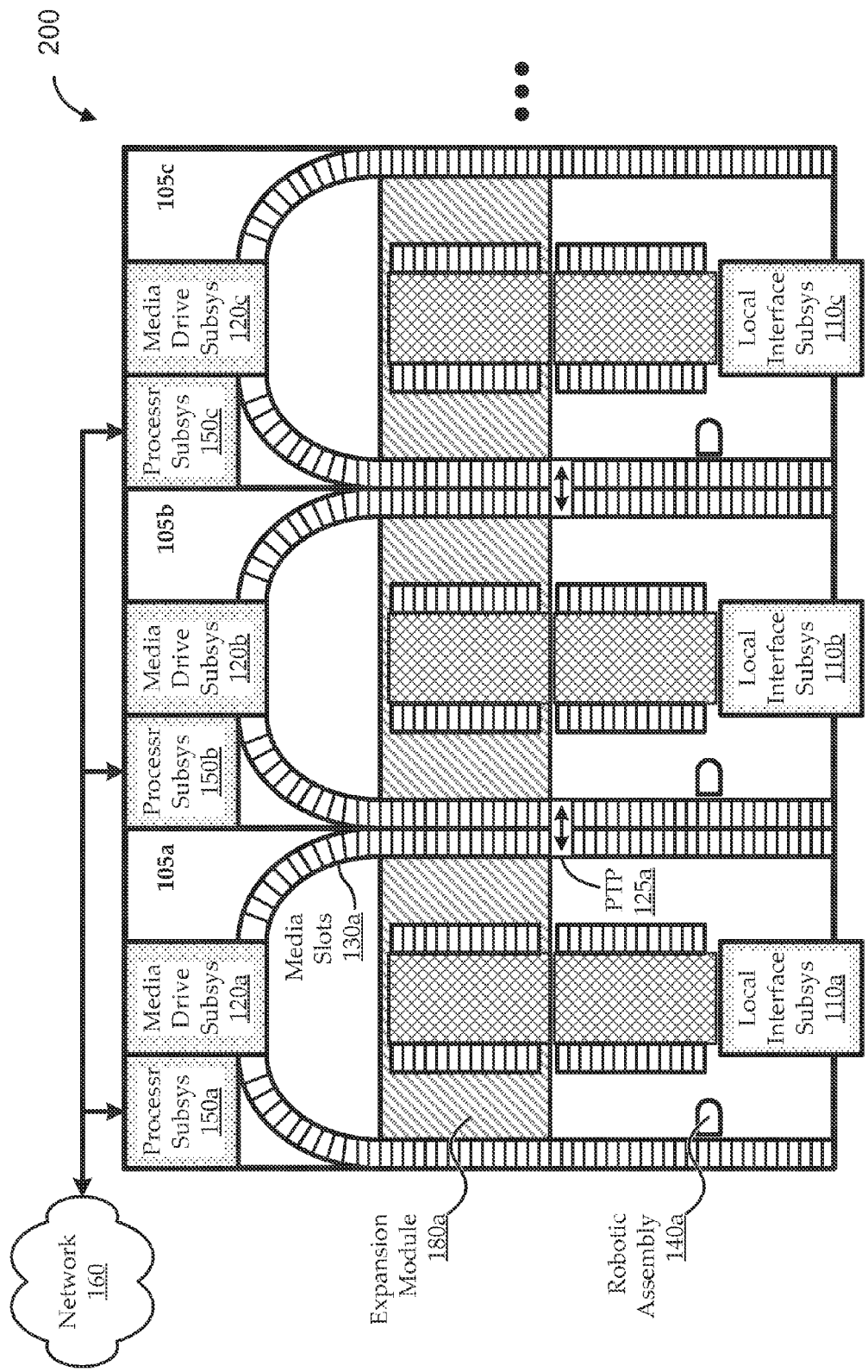
FIG. 2 shows an illustrative configuration of an expanded media library system implemented as a library complex.

Some embodiments of the media library system 105 can be expanded in one or more dimensions. FIG. 2 shows an illustrative configuration of an expanded media library system 105 implemented as a library complex 200. The library complex 200 includes a number of physically distinct media library systems 105. As illustrated, each media library system 105 can have its own local interface subsystem 110, media drive subsystem 120, processor subsystem 150, media slots 130, robotic assemblies 140, etc. Some or all of the individual media library systems 105 can also be expanded using expansion modules 180. For example, the expansion modules 180 are illustrated as adding media slots 130 to each media library system 105, but they can also or alternatively add media drives, processors, robotic assemblies 140, etc. in other implementations. In some implementations, the media library systems 105 are configured with pass-through ports (PTPs) 125, which can facilitate transferring of storage media from one media library system 105 to another media library system 105 in the library complex 200. It is noted that reference to the individual media library systems 105 as physically distinct is intended to include implementations in which there is limited physical interconnection among the libraries via PTPs, or the like.

The library complex 200 can be in communication with external interfaces in any suitable manner, for example, via one or more networks 160. The networks 160 can include any suitable communications framework, including local or wide-area communications, wired or wireless communications, secure or unsecure communications, etc. Communications can occur via "intra-complex" networks (e.g., a local-area network (LAN) between the media library systems 105 of the library complex 200) and/or via "external" networks. As used herein, an "external" network is intended to broadly include any network that facilitates communications to and/or from the library complex 200 (i.e., as opposed to only within the library complex 200). For example, the entire external network can be implemented as a LAN in a single room, along with the library complex 200 and one or more user terminals, or the external network can be implemented as the Internet, a distributed LAN, a wide-area network (WAN), or in any other suitable manner. In one implementation, each media library system 105 in the library complex 200 has its own, distinct communications path with one or more networks. This can provide certain features relating, for example, to redundancy, efficiency, security, etc. In another implementation, one media library system 105 of the library complex 200 is in direct communication with one or more networks, and the other media library systems 105 of the library complex 200 are in indirect communication with those networks via an intra-complex network. Some implementations use an Internet protocol (IP) network, so that communications can be implemented using standard IP techniques, browser-based graphical user interfaces (GUIs), standard transport mechanisms, etc. For example, intra-complex (or intra-library) communications within and/or between media library systems 105 and library components are implemented using Simple Network Management Protocol (SNMP), while communications with external networks and interfaces are implemented hypertext transport protocol (HTTP) and/or secure HTTP (HTTPS). Other communications can use proprietary or non-proprietary protocols, TCP/IP sockets, or any other suitable communications techniques.

Figure 3:
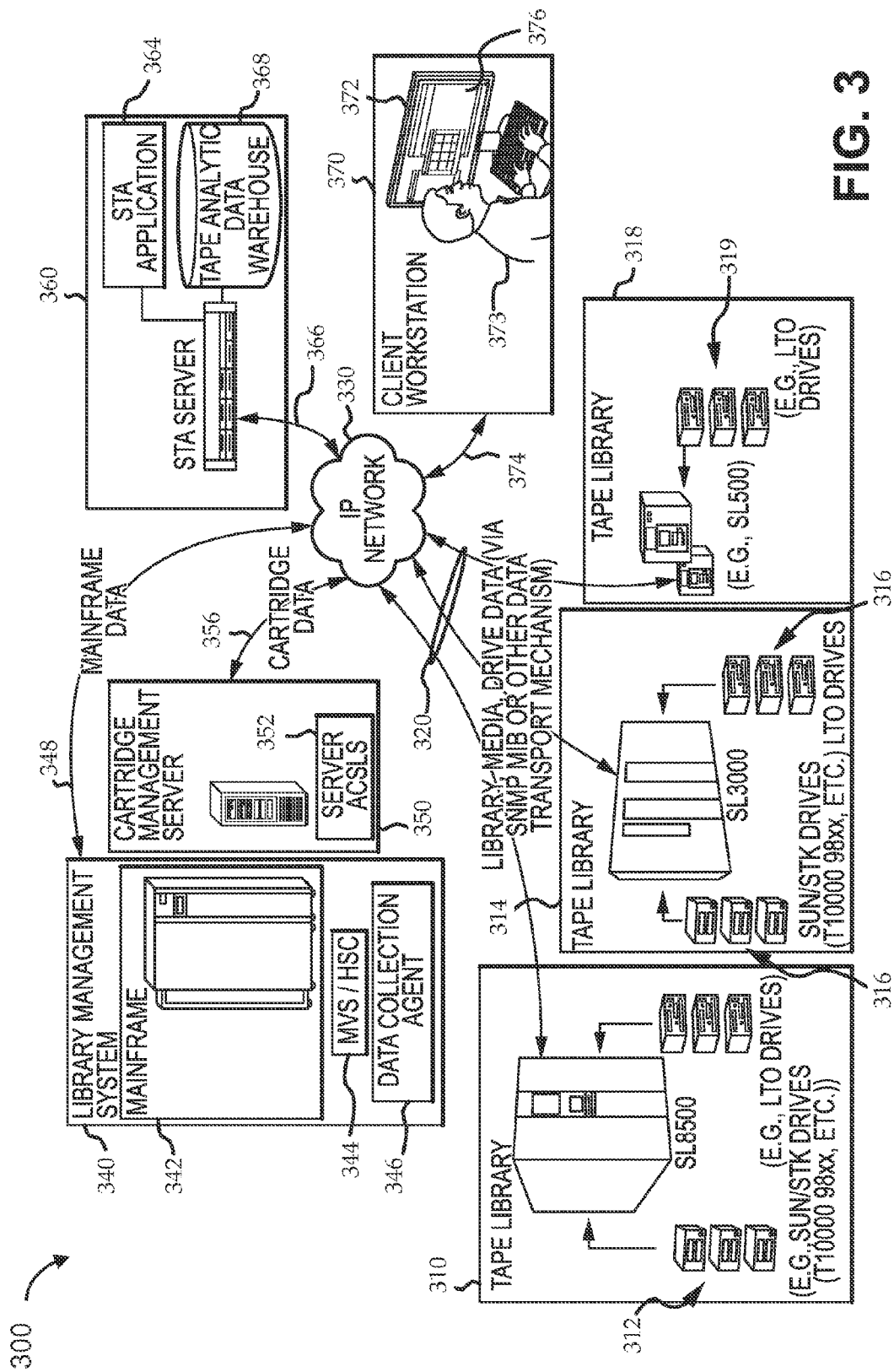
FIG. 3 shows a simplified diagram of an illustrative data storage system that provides further context for certain embodiments.

FIG. 3 shows a simplified diagram of an illustrative data storage system 300 that provides further context for certain embodiments. As illustrated, the system 300 includes a number of tape libraries 310, 314, 318, each with a number of tape drives 312, 316, 319. The tape libraries 310, 314, 318 can be implementations of the media library systems 105 of FIG. 1 or 2. For example, the libraries 310, 314, 318 may be implemented as Oracle's StorageTek libraries (e.g., the SL8500, SL3000, SL500, or similar or future libraries), and the drives 312, 316, 319 may be implemented Oracle's StorageTek drives (and media) (e.g., the T10000 A/B/C, T9840 C/D) or LTO 3/4/5 from HP and IBM. Tape media (e.g., cartridges) can be ferried between storage locations (e.g., a physical slot of a storage magazine) and one or more of the drives 312, 316, 319, where the tape media can be mounted and dismounted from the tape drives 312, 316, 319. As described below, operational data can be retrieved from the tape drives 312, 316, 319 at suitable times, for example during each dismount sequence.

The data storage system 300 can include or be in communication with any suitable functional components. For example, as illustrated, embodiments can include or be in communication with a library management system 340, a cartridge management server 350, a storage tape analytics server 360, etc. Embodiments of the library management system 340 can include a mainframe or other computer device running an operating system and management software applications 344. For example, the operating system can be Multiple Virtual Storage (MVS) provided by IBM, and the management software can be Host Software Component (HSC) provided by Oracle, or any other suitable operating systems and/or library management software can be utilized. A data collection agent 346 can be provided in the data storage system 300 to collect library management-specific (e.g., HSC-specific) data 348, which can be transmitted (e.g., via IP network 330) to the STA server 360 or other components of the data storage system 300. Embodiments of the cartridge management server 350 can run one or more applications 352, such as Automated Cartridge System Library Software (ACSLS), to control an automated cartridge system; and cartridge management-specific (e.g., ACSLS-specific) data 356 can be provided by the application 352 (e.g., over IP network 330) to any suitable component of the data storage system 300 (e.g., to the STA server 360 for use in analytics of tape operations in the tape libraries 310, 314, 318). Embodiments of the STA server 360 can implement an STA application 364 to manage collection and storage of various analytics data 366 (e.g., including or derived from data 320, 348, 356) from various data sources, which can be collected in a tape analytics data warehouse 368 (e.g., a database(s) in memory of server 360 or accessible by server 360) for use in performing various analytics functions. Implementations of the STA application 364 can provide a data warehouse approach to management of a tape infrastructure, which can involve gathering/receiving a wide variety of analytics data 366, storing and processing the analytics data 366 in the database 368, performing analytics on the analytics data 366 (e.g., monitoring, validating, and/or predicting health issues, media integrity, drive integrity, etc.), presenting out analytics data 366 or data derived therefrom (e.g., predictive health attributes and results of validation of media/drives), etc. While the STA server 360 illustrates a direct library communication approach, other embodiments can include any suitable analytics frameworks.

Some embodiments permit receipt of client data 374 (e.g., instructions, queries, etc.) from and output of client data 374 (e.g., analytics data 366 or data derived therefrom) to one or more local interfaces, client workstations 370, etc. For example, a user 373 can interface with the data system 300 using a client node or workstation 370 via a monitor/display device 372 and/or any suitable user interface device. As described above, the various components, client workstations 370, and/or other elements of the data system 300 can communicate over any suitable communications framework, including local or wide-area communications, wired or wireless communications, secure or unsecure communications, etc. For example, implementations use an Internet protocol (IP) network (such as network 330) and standard IP techniques, browser-based graphical user interfaces (GUIs) 376, standard transport mechanisms, etc. Intra-library and/or intra-complex communications can be implemented using SNMP, while external communications (e.g., client workstations 370) can be implemented using HTTP or HTTPS. Notably, some communications are over data paths, and others are over control paths. For example, some intra-library communications are control path communications between controllers of the library and devices of the library, while some host system communications are data path communications. Embodiments of the media library systems 105 can perform various functions relating to asynchronous retrieval of media drive operational data. These functions exploit control path communications between library controllers and the media drives.

Figure 4:
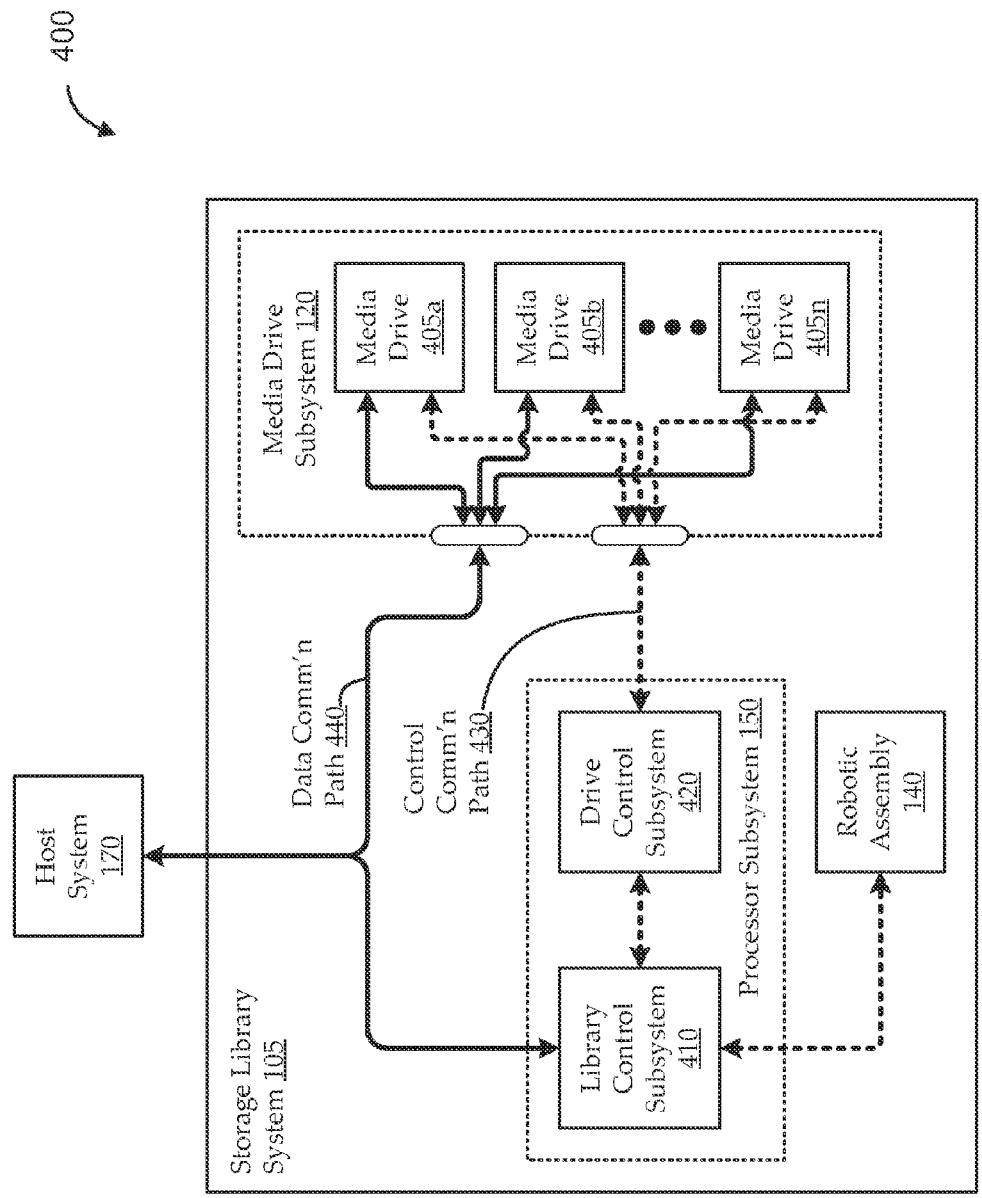
FIG. 4 shows a simplified functional block diagram of a library environment for implementing asynchronous retrieval of media drive operational data, according to various embodiments.

FIG. 4 shows a simplified functional block diagram of a library environment 400 for implementing asynchronous retrieval of media drive operational data, according to various embodiments. The library environment 400 includes a storage library system 105 in communication with a host system 170. The storage library system 105 has a processor subsystem 150 in communication with a media drive subsystem 120 (having a number of media drives 405) and a robotic assembly 140. Other subsystems, connections, components, etc. are not shown to avoid over-complicating the figure. As illustrated, some communications paths of the library can be categorized as "data communications paths" 440 (shown as solid lines) and "control communications paths" 430 (shown as dashed lines). In general, various library controllers (e.g., processors and other hardware and software components) communicate with components of the library over the control communications paths 430 to direct operations of the library components themselves. For example, these operations can include operating robotic assemblies 140, media drives 405, indicators, relays, sensors, etc. The data communications paths 440 are generally used by the host system 170 to communicate input/output data corresponding to the storage media and the data stored thereon. For example, when reading data from a storage medium in a media drive 405, the control communications paths 430 can be used to control and/or monitor operation of the media drive 405, while the data communications paths 440 can be used by the host system 170 to receive the data read from the drive 405. The specific architecture and arrangement of the components, including the number, type, and arrangement of communications paths, are intended to illustrate certain functionality and not to limit the scope of possible implementations. For example, other implementations can permit one or more host systems to communicate with various components via one or more control communications paths 430, and/or permit one or more library controllers to communicate with one or more systems, subsystems, components, etc. via one or more data communications paths 440.

As illustrated, the processor subsystem 150 includes a library control subsystem 410 and a drive control subsystem 420. Each of these control subsystems can include one or more hardware and/or software controllers that operate to control other components of the library. In some embodiments, the library control subsystem 410 handles at least top-level functions of the library, and can control some components via other controllers, such as the drive control subsystem 420 or a robotic controller (not shown). In the illustrated embodiment, the library control subsystem 410 controls operation of the media drive subsystem 120 via an intermediate drive control subsystem 420, all at least via control communications paths 430. For example, when mounting a media drive 405, the drive control subsystem 420 can control drive-level operations, such as determining and/or confirming drive status, while the library control subsystem 410 can control library-level operations, such as directing the robotic assembly 140 to pick an appropriate storage medium from a media slot location and ferry the storage medium to the media drive 405. In some implementations, the drive control subsystem 420 is in communication with each media drive 405 via a respective control communications path 430, and the host system 170 is in communication with each media drive 405 via a respective data communications path 440 (only one path is shown between the media drive subsystem 120 and each of the drive control subsystem 420 and the host system 170 for the sake of simplifying the illustration).

As described above, is often desirable to monitor and maintain operational information about the various media drives 405 in the media drive subsystem 120, such as a number of hours the media drive has been powered on, performance data relating to the media drive, data relating to the experience of media while in the media drive, etc. Traditionally, sending a request for operational data to a media drive 405, waiting for the media drive 405 to output the operational data, receiving the requested operational data from the media drive 405, etc. involves coordinating timing with other drive requests, such as input/output requests issued over the data communications paths 440. Impacting the data path and/or timing of host-level communications with the drive can be undesirable in some cases. Even if the control communications paths 430 were used (particularly at the library-level), it could be undesirable for those operational data retrieval commands to impact timing of other control path communications.

Figure 5:
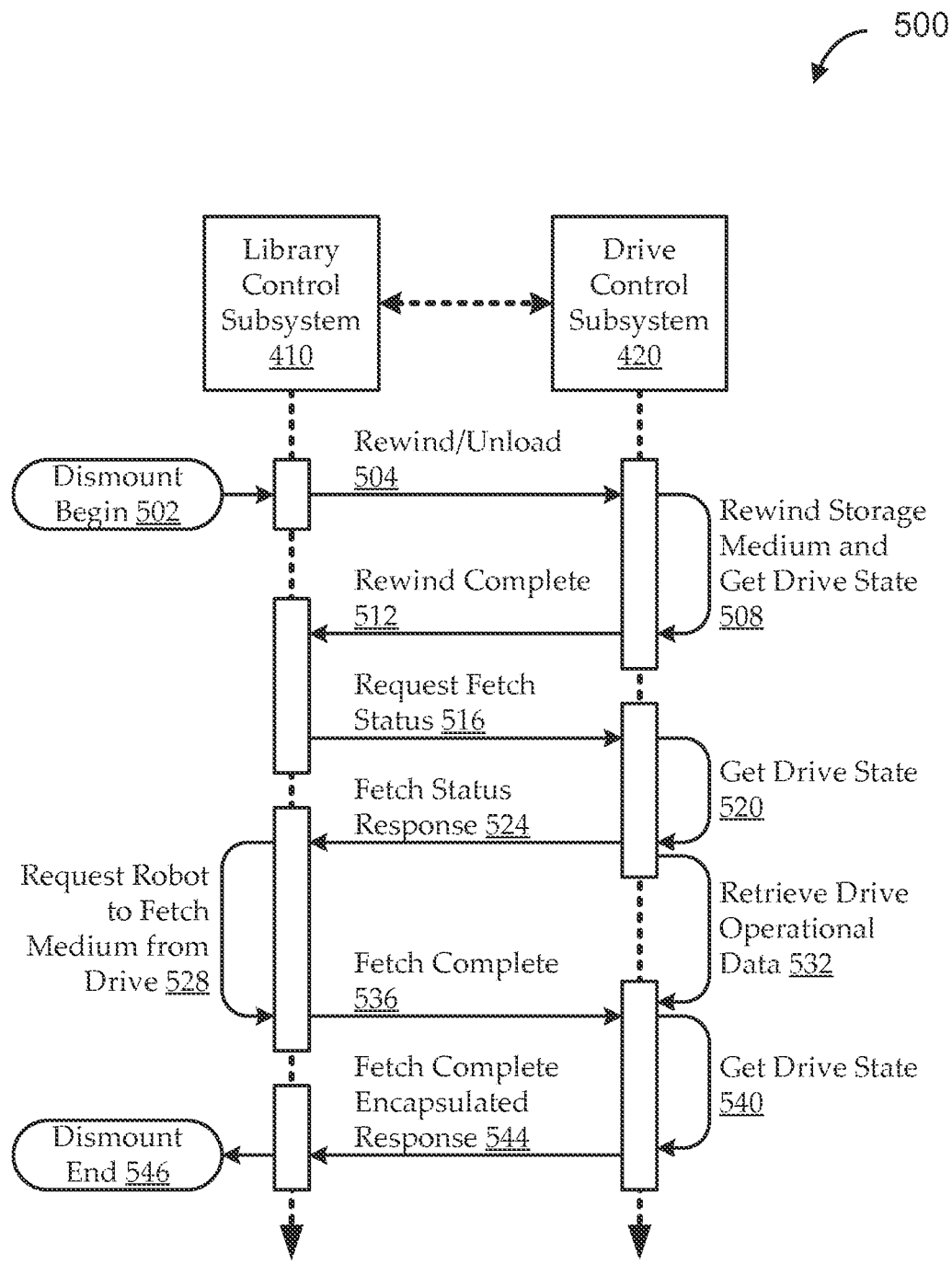
FIG. 5 shows an illustrative data flow diagram for implementing operational data retrieval, according to various embodiments.

Accordingly, embodiments exploit local control path functions available to the drive control subsystem 420 to perform the operational data retrieval in a manner that is effectively asynchronous (e.g., transparent) to other data and control path operations. For the sake of added clarity, FIG. 5 shows an illustrative data flow diagram 500 for implementing operational data retrieval, according to various embodiments. The data flow diagram 500 is shown in context of communications over the control communications paths 430 between the library control subsystem 410 and the drive control subsystem 420 of FIG. 4. The illustrated embodiment exploits idle time during a drive dismount sequence to retrieve operational data from a media drive. Other implementations can exploit other idle times to perform the retrieval.

Embodiments begin by commencing a media drive dismount sequence at block 502. For example, a drive dismount can occur when input/output functions being performed on a storage medium in the media drive have completed, and it is time to eject the medium from the drive and to return the medium to its appropriate media slot in the library. A rewind/unload instruction 504 can be communicated from the library control subsystem 410 to the drive control subsystem 420, instructing the drive control subsystem 420 to begin the dismount sequence. In response to the instruction 504, the drive control subsystem 420 can control a particular media drive 405 to perform a rewind sequence 508. For example, the rewind sequence 508 can involve rewinding the storage medium that is in the media drive 405 and returning a drive state to the drive control subsystem 420 when the rewind is complete. In some implementations, there is no rewind sequence. For example, some implementations can rewind the medium as part of the mount sequence, or can use media that are not rewound (e.g., optical discs, etc.). In such implementations, the dismount sequence can still receive a drive state at stage 508, begin at stage 516 (below), or proceed in any suitable manner. Having received an indication (e.g., a drive state response from the drive) that the media drive 405 has completed the rewind sequence 508, the drive control subsystem 420 can communicate a rewind complete response 512 back to the library control subsystem 410, indicating that the medium has been rewound.

In some embodiments, an additional request and response cycle can be performed to ensure that the medium is ready to be fetched from the media drive 405. For example, it can be desirable to check the status of the drive to confirm that the medium is ready for fetching (e.g., ejected, idle, etc.), the media drive 405 is idle, etc. Accordingly, the library control subsystem 410 can communicate a fetch status request 516 to the drive control subsystem 420. In response to the request 516, the drive control subsystem 420 can get the present drive state 520 from the media drive 405 and can return a fetch status response 524 to the library control subsystem 410. Having confirmed that the media drive 405 is ready for fetching of its presently loaded storage medium, the library control subsystem 410 can initiate a fetch sequence 528 using the robotic assembly 140. For example, the library control subsystem 410 can instruct the robotic assembly 140 (e.g., a robot controller) to physically move to the location of the media drive 405, pick (e.g., grab) the medium from the media drive 405, ferry the medium to an appropriate media slot location in the library, and place the medium in the media slot location. When the fetch sequence 528 is complete (e.g., or when a relevant portion is complete, such as after the medium has been physically removed from the media drive 405 by the robotic assembly 140, even if it has not yet been placed in its media slot location), the library control subsystem 410 can communicate a fetch complete instruction 536 to the drive control subsystem 420. In response to the fetch complete instruction 536, the drive control subsystem 420 can get the present drive state 540 from the media drive 405 and can return a fetch complete response 544 to the library control subsystem 410. At this point, the dismount sequence can be complete 546.

Even in storage library implementations having relatively fast-moving robotic assemblies 140, the fetch sequence 528 can take an appreciable amount of time. For example, it can take seconds for a robotic assembly 140 to move to the media drive 405, accurately pick the medium from the drive, etc. During this time, the media drive 405 is typically idle. For example, it can be undesirable to allow the drive to be accessed again (e.g., by the host system 170) until the library system can be certain that the dismount sequence is complete. Embodiments exploit the idle time of the media drive during the fetch sequence 528 to retrieve operational data relating to the media drive 405 (e.g., during every dismount sequence or during only some dismount sequences). As illustrated, during the idle drive time when the fetch sequence 528 is being performed, the drive control subsystem 420 can interface with the media drive 405 to retrieve the drive's operational data. For example, the operational data can be identification data (e.g., the drive's volume identifier, etc.), accumulated data (e.g., a total amount of time since the drive was last powered down or serviced), mount-specific data (e.g., information about the experience of the drive and/or the medium between the preceding mounting of the drive and this dismounting of the drive), and/or any other suitable operational data. Typically, retrieval of the operational data from the media drive 405 can take a very short time relative to the time it takes to complete the fetch sequence 528. Accordingly, the retrieval of the operational data can be performed without impacting the timing of any other communications over the data communications paths 440 or the control communications paths 430. In some implementations, to further minimize the impact of the operational data retrieval, the retrieved data can be communicated as part of another communication. In some implementations, the retrieved operational data is communicated along with the fetch complete response 544. For example, the data can be encapsulated in the fetch complete response 544 or otherwise sent substantially concurrently. In other implementations, the retrieved data is collected by a memory of the drive control subsystem 420 and communicated at other suitable (e.g., idle) times to the library control subsystem 410 or in any other suitable manner.

Figure 6:
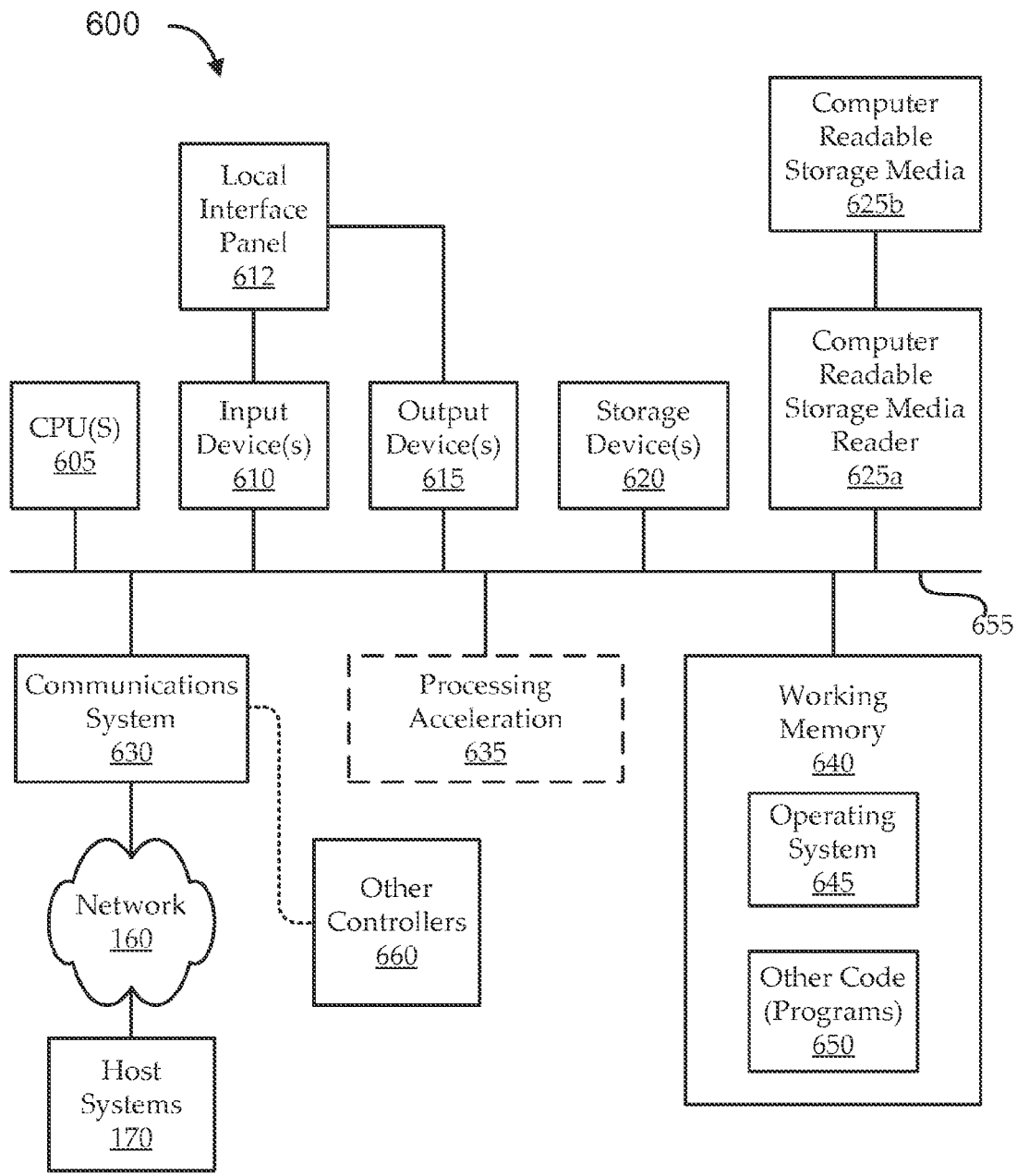
FIG. 6 shows an illustrative computational system for implementing functionality of various embodiments.

FIG. 6 shows an illustrative computational system 600 for implementing functionality of various embodiments. The computational system 600 can include or perform functions of the processor subsystem 150, for example, including the media drive operational data retrieval functions described herein. For the sake of simplicity, the computational system 600 is shown including hardware elements that can be electrically coupled via a bus 655. However, embodiments of the computational system 600 can be implemented as or embodied in single or distributed computer systems, in one or more locations, or in any other useful way.

The hardware elements can include one or more central processing units (CPUs) 605, one or more input devices 610 (e.g., a mouse, a keyboard, etc.), and one or more output devices 615 (e.g., a display device, a printer, etc.). In some implementations, a local interface panel 612 (e.g., of the local interface subsystem 110) is used as an input and output device. The computational system 600 can also include one or more storage devices 620. By way of example, storage device (s) 620 can be disk drives, optical storage devices, solid-state storage device such as a random access memory (RAM) and/or a read-only memory (ROM), which can be programmable, flash-updateable and/or the like. The computational system 600 can additionally include a computer-readable storage media reader 625*a*, which can further be connected to a computer-readable storage medium 625*b*, together (and, optionally, in combination with storage device(s) 620) comprehensively representing remote, local, fixed, and/or removable storage devices plus storage media for temporarily and/or more permanently containing computer-readable information. In some embodiments, the computational system 600 can also include a processing acceleration unit 635, which can include a DSP, a special-purpose processor and/or the like.

The computational system 600 can also working memory 640, which can include RAM and ROM devices, for example, as described above. Software elements can be located within the working memory 640, for example, including an operating system 645 and/or other code 650, such as an application program (which can be a client application, web browser, mid-tier application, relational database management system (RDBMS), etc.). In some embodiments, one or more MDV functions are implemented as instructions stored as application code 650 in working memory 640, which, when executed, cause the one or more processors 605 to perform corresponding functions.

In some implementations, the computational system 600 includes a communications system 630 (e.g., a modem, a network card (wireless or wired), an infra-red communication device, etc.). The communications system 630 can permit data to be exchanged with a network 160 and/or any other computer described above with respect to the computational system 600. For example, via the network 160, the computational system 600 can communicate with one or more host systems 170 over one or more data communications paths, and/or the computational system 600 can communicate with one or more other controllers 660 over one or more control communications paths. Alternate embodiments of the computational system 600 can have numerous variations from those described above without departing from the scope of embodiments. For example, customized hardware might also be used and/or particular elements might be implemented in hardware, software (including portable software, such as applets), or both. Further, connection to other computing devices such as network input/output devices can be employed. In various embodiments of computational systems, like the one illustrated in FIG. 6, are used to implement one or more methods, such as those described below.

Figure 7:
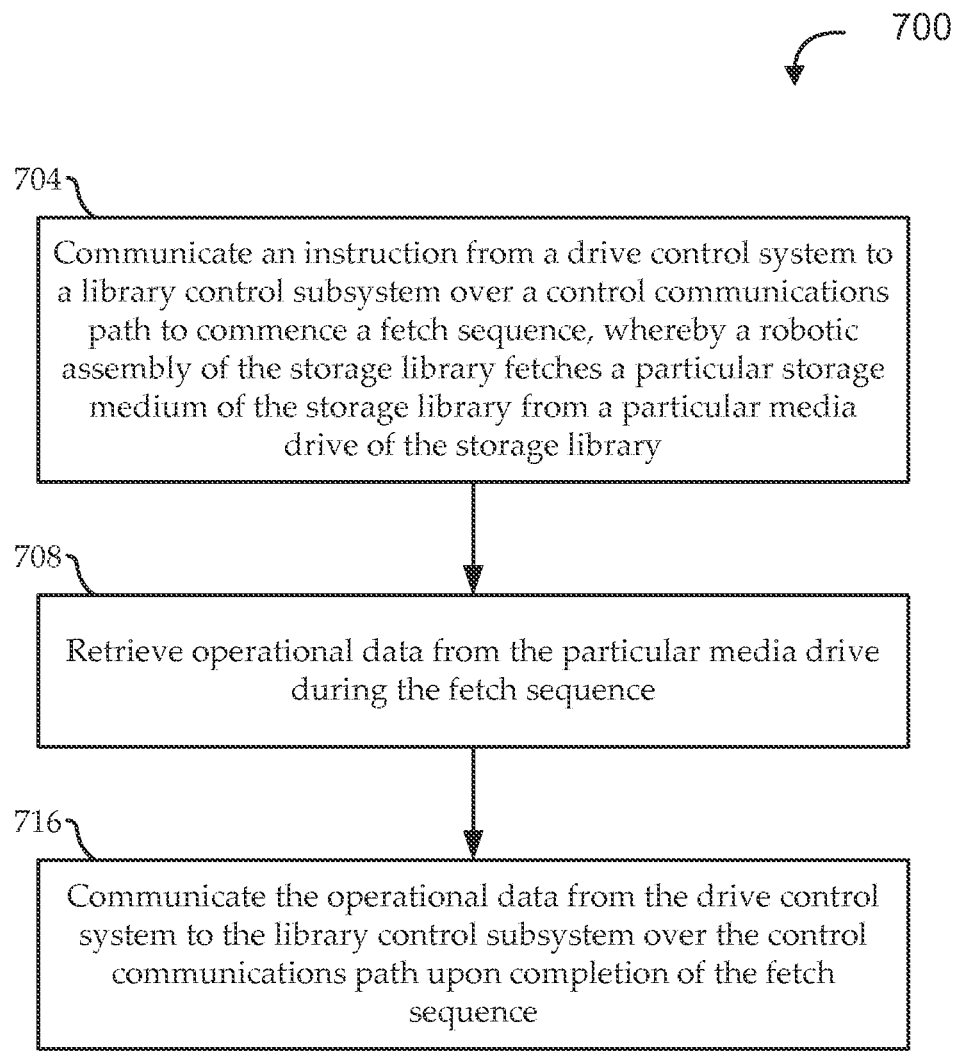
FIG. 7 shows a flow diagram of an illustrative method for asynchronous retrieval of media drive operational data in a storage library, according to various embodiments.

FIG. 7 shows a flow diagram of an illustrative method 700 for asynchronous retrieval of media drive operational data in a storage library, according to various embodiments. The method 700 operates in context of a storage library that is in communication with a host system over one or more data communications paths and has library controllers that send control data and instructions to library components over at least one control communications path. Embodiments begin at stage 704 by communicating an instruction from a drive control subsystem to a library control subsystem over a control communications path to commence a fetch sequence. The fetch sequence can be a sequence by which a robotic assembly of the storage library fetches a particular storage medium of the storage library from a particular media drive of the storage library. In some embodiments, communications over the control communications path are asynchronous with respect to communications between a host system and the media drives over a data communications path.

It is noted that, while embodiments are described with reference to the fetch sequence, the method 700 can operate in context of any control sequence during which the media drive will effectively be idle (e.g., where data path communications to and from the host system are not permitted), so that retrieval of the drive operational data does not interfere with (or impact the timing of) other drive-related instructions. For example, in some implementations, the fetch sequence technically begins with an instruction from the library controller (e.g., the Request Fetch Status instruction 516 of FIG. 5), and not with an instruction from the drive controller, as indicated by stage 704. However, even in such implementations, it is typically not until the drive controller sends its instruction back to the library controller that the actual fetching (e.g., the robotic sequence) commences and the drive can reliably be considered idle. Similarly, other types of control sequences can begin or end in any suitable manner, but embodiments can focus on a portion of such a sequence during which the drive can be considered idle, so that retrieval of the drive operational data is effectively transparent with respect to the sequence (and/or other drive-related) instructions.

At stage 708, operational data is received from the particular media drive during the fetch sequence. For example, while the robotic assembly is physically carrying out the fetch sequence, the media drive can be idle, and the operational data can be generated and/or retrieved during that idle time. At stage 712, the operational data can be communicated from the drive control system to the library control subsystem over the control communications path upon completion of the fetch sequence. For example, the operational data can be encapsulated with a fetch complete instructions. In alternative embodiments, the operational data can be communicated back to the library control subsystem at any suitable time.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A storage library system comprising:
a plurality of storage media;
a plurality of media drives that operate to perform input/output functions on the storage media;
a robotic assembly that operates to ferry the storage media between media slot locations and the media drives;
a drive control subsystem that is in communication with the media drives over a control communications path and operates to:
instruct a library control subsystem to commence a fetch sequence, whereby the robotic assembly fetches a particular one of the storage media from a particular one of the media drives;
retrieve operational data from the particular media drive during the fetch sequence; and
communicate the operational data to the library control subsystem upon completion of the fetch sequence.

2. The system of claim 1, wherein the drive control subsystem and the library control subsystem communicate over the control communications path.

3. The system of claim 1, further comprising:
a host system in communication with the plurality of media drives over a data communications path,
wherein communications over the control communications path are asynchronous with respect to communications over the data communications path.

4. The system of claim 1, wherein the drive control subsystem operates to communicating the operational data to the library control subsystem upon completion of the fetch sequence by:
receiving a fetch complete instruction from the library control subsystem indicating completion of the fetch sequence;
determining a present status of the particular media drive in response to receiving the fetch complete instruction;
encapsulating the operational data with the present status in a fetch complete response; and
communicating the fetch complete response to the library control subsystem.

5. The system of claim 1, wherein the fetch sequence is part of a drive dismount sequence.

6. The system of claim 1, wherein the drive control subsystem operates to perform the instruct, retrieve, and communicate functions each time the particular media drive is dismounted.

7. The system of claim 1, wherein the plurality of storage media are tape storage cassettes, and the plurality of media drives are tape drives.

8. The system of claim 7, wherein the drive control subsystem further operates to:
rewind a particular one of the tape storage cassettes that is in the particular media drive prior to instructing the library control subsystem to commence the fetch sequence;
communicate a rewind complete instruction to the library control subsystem when the particular tape storage cassette is rewound;
receive a fetch status request from the library control system subsequent to communicating the rewind complete instruction; and
instruct the library control subsystem to commence the fetch sequence in response to receiving the fetch status request.

9. The system of claim 1, wherein the drive control subsystem comprises a set of processors.

10. A method for asynchronous drive communications in a storage library having a plurality of media drives, in communication with at least one host system over a data communications path, and in communication with a drive control subsystem over a control communications path, the method comprising:
communicating an instruction from a drive control subsystem to a library control subsystem over the control communications path to commence a control sequence during which communication between the at least one host system and a particular one of the media drives over the data communications path is not permitted;
retrieving operational data from the particular media drive during the control sequence; and
communicating the operational data from the drive control system to the library control subsystem over the control communications path in conjunction with an instruction of the control sequence.

11. The method of claim 10, wherein communicating the operational data from the drive control system to the library control subsystem over the control communications path in conjunction with an instruction of the control sequence comprises communicating the operational data upon completion of the control sequence.

12. The method of claim 10, wherein the control sequence is a fetch sequence during which a robotic assembly of the storage library fetches a particular one of a plurality of storage media of the storage library from the particular media drive.

13. The method of claim 10, wherein the drive control subsystem and the library control subsystem communicate over the control communications path.

14. The method of claim 10, wherein communications over the control communications path are asynchronous with respect to communications over the data communications path.

15. The method of claim 10, wherein communicating the operational data to the library control subsystem in conjunction with an instruction of the control sequence comprises:
- receiving a control sequence complete instruction from the library control subsystem indicating completion of the control sequence;
- determining a present status of the particular media drive in response to receiving the control sequence complete instruction;
- encapsulating the operational data with the present status in a control sequence complete response; and
- communicating the control sequence complete response to the library control subsystem.

16. The method of claim 10, wherein the control sequence is part of a drive dismount sequence.

17. The method of claim 10, further comprising:
- rewinding a storage medium that is in the particular media drive prior to instructing the library control subsystem to commence the control sequence;
- communicating a rewind complete instruction to the library control subsystem when the storage medium is rewound;
- receiving a control sequence status request from the library control system subsequent to communicating the rewind complete instruction,
- wherein the library control subsystem is instructed to commence the control sequence in response to receiving the control sequence status request.

18. A system for asynchronous drive communications in a storage library, the system comprising:
- a plurality of media drives in communication with at least one host system over a data communications path;
- a non-transient memory that has instructions stored thereon; and
- a set of processors in communication with the plurality of media drives over a control communications path and in communication with the memory, the set of processors operating, when the instructions are executed, to perform steps comprising:
  - communicating an instruction to a library control subsystem over the control communications path to commence a control sequence during which communication between the at least one host system and a particular one of the media drives over the data communications path is not permitted;
  - retrieving operational data from the particular media drive during the control sequence; and
  - communicating the operational data to the library control subsystem over the control communications path in conjunction with an instruction of the control sequence.

19. The system of claim 18, wherein the control sequence is a fetch sequence during which a robotic assembly fetches a particular one of a plurality of storage media from the particular media drive.

20. The system of claim 18, wherein communicating the operational data to the library control subsystem in conjunction with an instruction of the control sequence comprises:
- receiving a control sequence complete instruction from the library control subsystem indicating completion of the control sequence;
- determining a present status of the particular media drive in response to receiving the control sequence complete instruction;
- encapsulating the operational data with the present status in a control sequence complete response; and
- communicating the control sequence complete response to the library control subsystem.

* * * * *